US008622811B1

(12) United States Patent
Aoki et al.

(10) Patent No.: US 8,622,811 B1

(45) Date of Patent: Jan. 7, 2014

(54) WAGERING GAME WITH A GUARANTEED BUT VARIABLE BONUS PAYOUT

(71) Applicant: WMS Gaming Inc., Waukegan, IL (US)

(72) Inventors: Dion K. Aoki, Chicago, IL (US); Allon G. Englman, Chicago, IL (US); Michael W. Mastropietro, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 13/775,505

(22) Filed: Feb. 25, 2013

Related U.S. Application Data

(60) Provisional application No. 61/707,324, filed on Sep. 28, 2012.

(51) Int. Cl.
*G06F 17/00* (2006.01)

(52) U.S. Cl.
USPC .................... 463/20; 463/16; 463/17; 463/25

(58) Field of Classification Search
USPC .............. 463/16–17, 20–25, 40–43; 273/192, 273/292, 148 R
See application file for complete search history.

(56) References Cited

U.S. PATENT DOCUMENTS

| | | | | |
|---|---|---|---|---|
| 6,517,433 | B2 | 2/2003 | Loose et al. | |
| 7,857,699 | B2 * | 12/2010 | Baerlocher | 463/27 |
| 2004/0023710 | A1 * | 2/2004 | McGahn et al. | 463/16 |
| 2004/0152507 | A1 | 8/2004 | Baerlocher et al. | |
| 2004/0229700 | A1 * | 11/2004 | Cannon et al. | 463/42 |
| 2005/0101375 | A1 | 5/2005 | Webb et al. | |
| 2008/0102920 | A1 * | 5/2008 | Baerlocher | 463/20 |
| 2008/0182657 | A1 | 7/2008 | Bennett et al. | |
| 2009/0121425 | A1 * | 5/2009 | Berkowitz | 273/139 |
| 2009/0247277 | A1 | 10/2009 | Caspers et al. | |
| 2010/0016065 | A1 * | 1/2010 | Nicely et al. | 463/25 |
| 2010/0069160 | A1 | 3/2010 | Barrett | |
| 2010/0234099 | A1 | 9/2010 | Rasmussen | |
| 2011/0053676 | A1 | 3/2011 | Wolf et al. | |
| 2011/0223983 | A1 * | 9/2011 | Schwartz et al. | 463/17 |

* cited by examiner

*Primary Examiner* — Masud Ahmed

(74) *Attorney, Agent, or Firm* — Nixon Peabody LLP

(57) ABSTRACT

A gaming system and method includes one or more input devices, display devices, processors, and memory devices. The memory device(s) store instructions that, when executed by the processor(s), cause the gaming system to receive an input indicative of a wager for a base wagering game, initiate the base wagering game, initiate a bonus game, and establish a minimum bonus payout threshold for the bonus game. At least one bonus game outcome is determined for the bonus game. An aggregate award is determined for the at least one bonus game outcome. In response to the aggregate award being greater than the minimum bonus payout threshold, the aggregate award is awarded. In response to the aggregate award being less than the minimum bonus payout threshold, the aggregate award is awarded plus a supplemental award. The supplemental award is equal to the difference between the minimum bonus payout threshold and the aggregate award.

20 Claims, 8 Drawing Sheets

WAGERING GAME WITH A GUARANTEED BUT VARIABLE BONUS PAYOUT

CROSS-REFERENCE TO RELATED APPLICATION

This application is related to and claims the benefits of U.S. Patent Application No. 61/707,324, filed Sep. 28, 2012, which is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus and methods and, more particularly, to a wagering game with variable bonus payouts.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

SUMMARY OF THE INVENTION

According to one aspect of the present invention, a gaming system comprises one or more input devices, one or more display devices, one or more processors, and one or more memory devices storing instructions that, when executed by the one or more processors, cause the gaming system to implement several acts. An input indicative of a wager for a base wagering game is received via at least one of the one or more input devices. The base wagering game is initiated. A bonus game that is associated with the base wagering game is initiated. A minimum bonus payout threshold for the bonus game is established. At least one bonus game outcome for the bonus game is determined. An aggregate award for the at least one bonus game outcome is determined. In response to the aggregate award being greater than the minimum bonus payout threshold, the aggregate award is awarded. In response to the aggregate award being less than the minimum bonus payout threshold, the aggregate award is awarded plus a supplemental award. The supplemental award is equal to the difference between the minimum bonus payout threshold and the aggregate award.

According to another aspect of the invention, a computer-implemented method in a gaming system comprises receiving, via at least one of one or more input devices, an input indicative of a wager for a base wagering game. A base wagering game is initiated by at least one of one or more processors. A minimum bonus payout threshold for a bonus game is determined by at least one of the one or more processors. The bonus game is initiated by at least one of the one or more processors in response to a bonus triggering event in the base wagering game. A bonus game outcome for the bonus game is determined by at least one of the one or more processors. An aggregate award for the bonus game outcome is determined by at least one of the one of more processors. In response to the aggregate award being greater than the minimum bonus payout threshold, the aggregate award is awarded. In response to the aggregate award being less than the minimum bonus payout threshold, the aggregate award is awarded plus a supplemental award. The supplemental award is equal to the difference between the minimum bonus payout threshold and the aggregate award.

According to yet another aspect of the invention, physical machine-readable storage media include instructions which, when executed by one or more processors, cause the one or more processors to perform the above methods.

Additional aspects of the invention will be apparent to those of ordinary skill in the art in view of the detailed description of various embodiments, which is made with reference to the drawings, a brief description of which is provided below.

Figure 1:
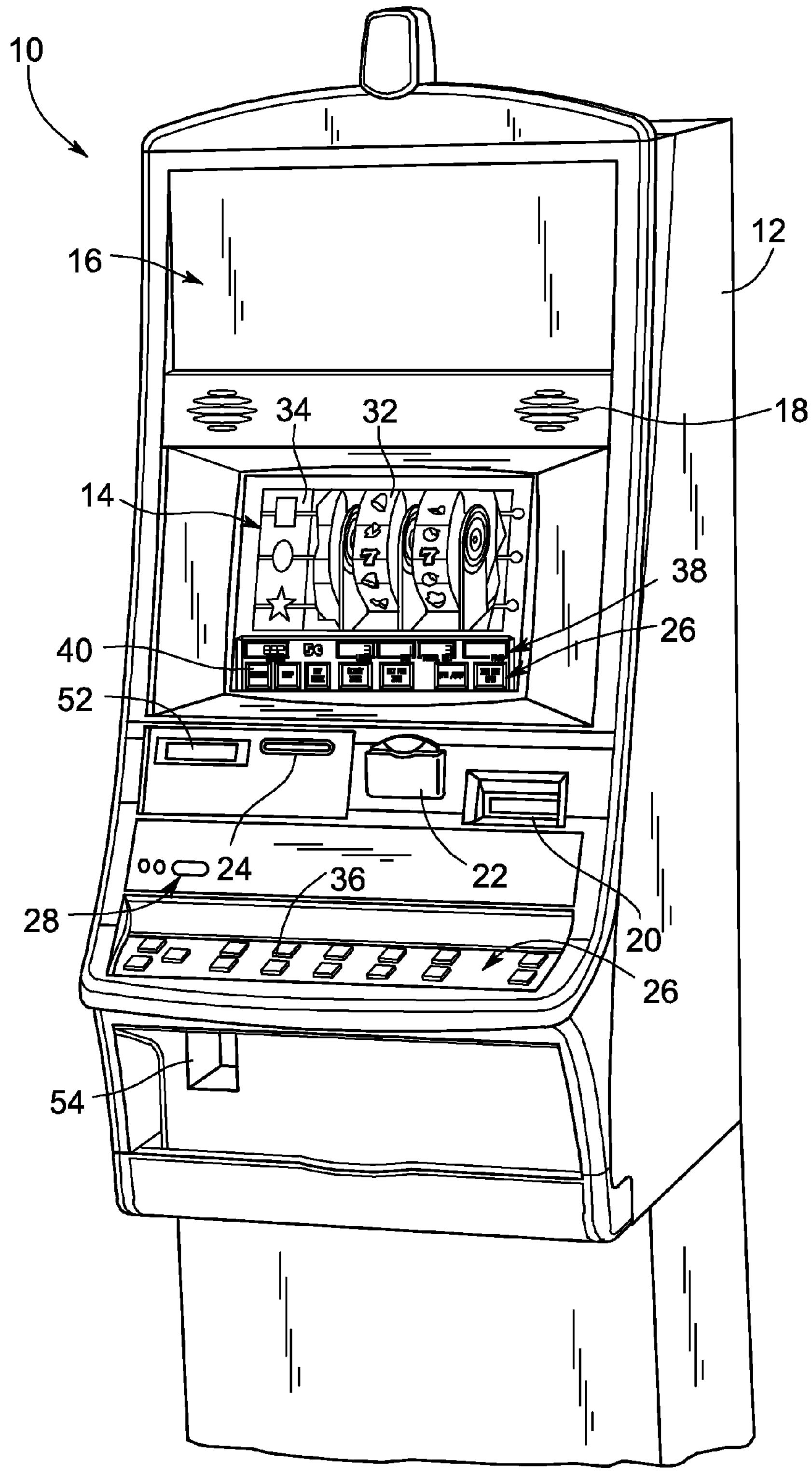
FIG. 1 (PRIOR ART)
FIG. 1 is a perspective view of an exemplary free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433, titled "Reel Spinning Slot Machine With Superimposed Video Image," U.S. Patent Application Publication Nos. US2010/0069160, titled "Handheld Wagering Game Machine And Docking Unit," and US2010/0234099, titled "Wagering Game System With Docking Stations" which are incorporated herein by reference in their entireties.

The gaming terminal 10 illustrated in FIG. 1 comprises a cabinet 11 that may house various input devices, output devices, and input/output devices. By way of example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
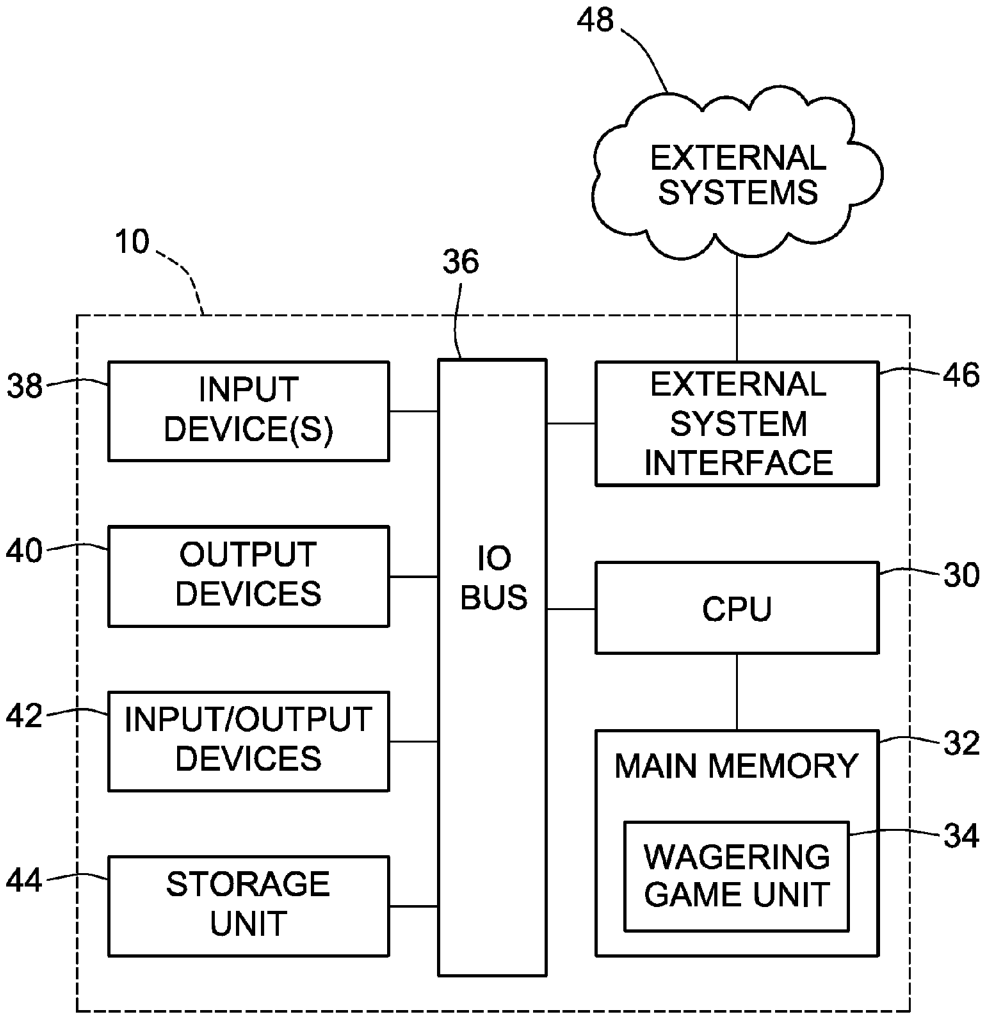
FIG. 2 (PRIOR ART)
FIG. 2 is a schematic view of an exemplary gaming system according to an embodiment of the present invention.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
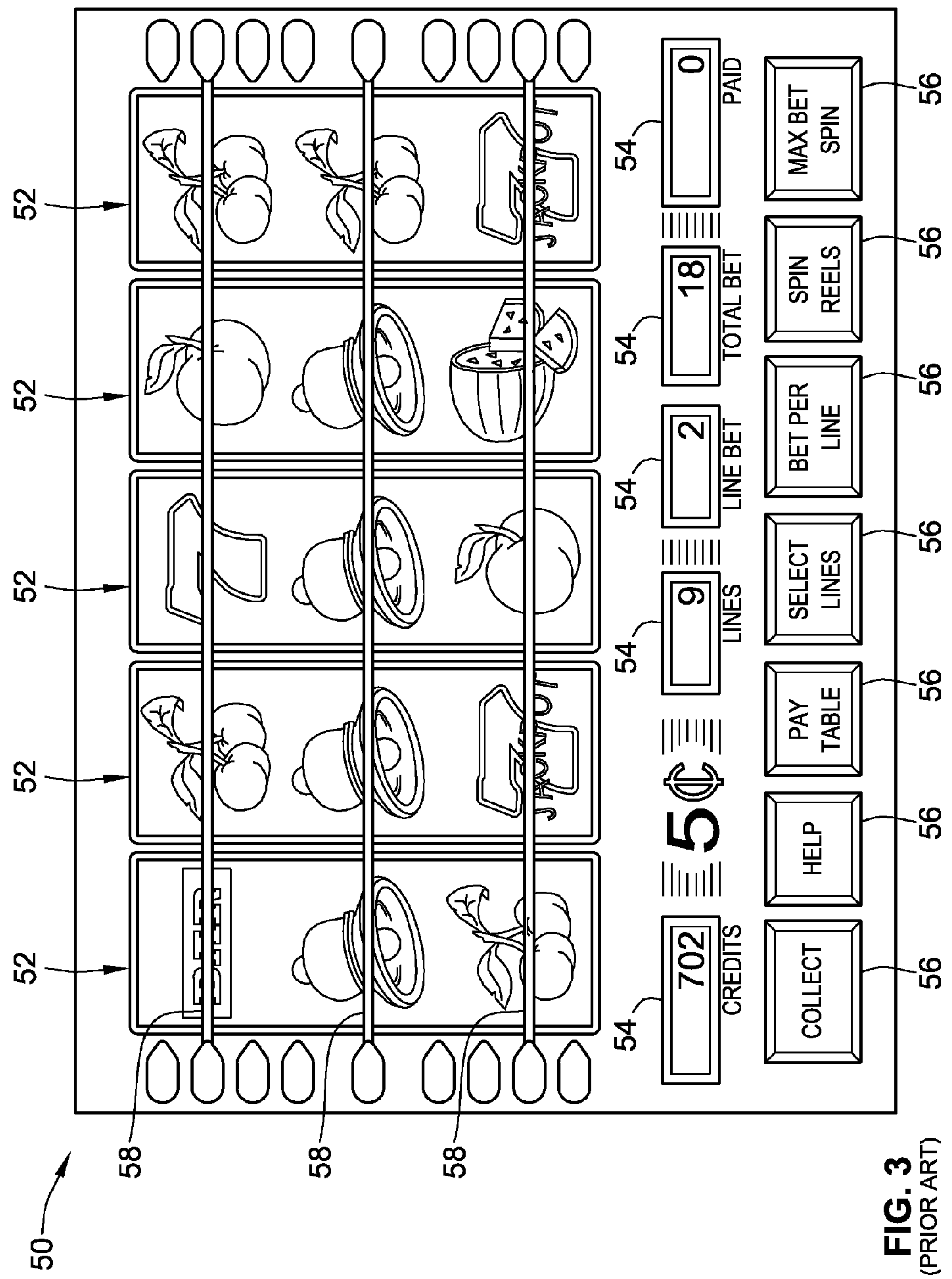
FIG. 3 (PRIOR ART)
FIG. 3 is an image of an exemplary basic-game screen of a wagering game displayed on a gaming terminal, according to an embodiment of the present invention.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving an input indicative of a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4:
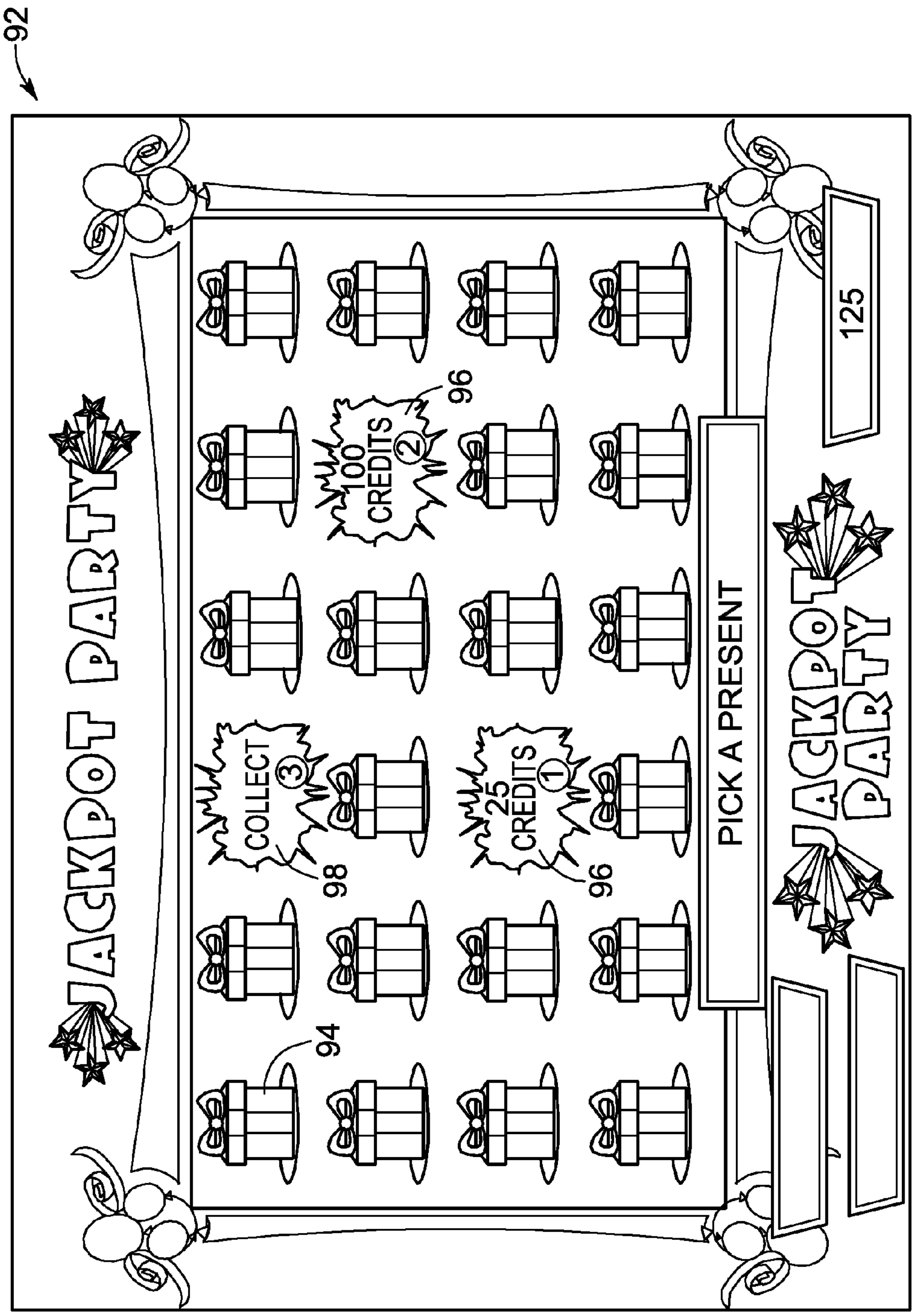
FIG. 4 (PRIOR ART)
FIG. 4 is an image of an exemplary bonus-game screen of a wagering game displayed on a gaming terminal, according to an embodiment of the present invention.

Turning now to FIG. 4, an example of a bonus game to a basic wagering game is illustrated. A bonus-game screen 92 includes an array of markers 94 located in a plurality of columns and rows. The bonus game is entered upon the occurrence of a triggering event, such as the occurrence of a start-bonus game outcome (e.g., symbol trigger, mystery trigger, time-based trigger, etc.) in or during the basic wagering game. Alternatively, any bonus game described herein is able to be deployed as a stand-alone wagering game independent of a basic wagering game.

In the illustrated bonus game of FIG. 4, a player selects, one at a time, from the array of markers 94 to reveal an associated bonus-game outcome. According to one embodiment of this bonus game, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

According to some aspects of a wagering game, a bonus game can include guaranteeing a minimum bonus payout to a player. According to these aspects, the minimum bonus payout is not determined by an outcome of a bonus game, and instead, a player is awarded at least a predetermined amount of credits for just playing the bonus game. The minimum bonus payout can also be understood to be a minimum bonus-credit threshold that a player will be awarded at the end of the bonus game, regardless of the results and various outcomes of the bonus game itself. In some aspects of a wagering game, the minimum bonus threshold can be constant for all bonus games or plays thereof. It is also contemplated that the minimum bonus payout threshold may be variable from one bonus-game instance to another bonus-game instance. Once a bonus triggering event occurs during a base wagering game or otherwise, and a guaranteed value (e.g., minimum payout) is determined, whether being predetermined or randomly selected, the bonus game is executed similar to a standard bonus game with the exception that the bonus award will include an aggregate award based on the outcome of the bonus game plus a supplemental award if the aggregate award does not exceed a minimum threshold value.

In one exemplary aspect of the wagering game, a bonus game may be initiated where a player is granted a bonus of a plurality of free spins to be played out and with individual awards of each free spin being determined as part of the bonus. After the player completes the free spins, the awards for the plurality of free spins can be aggregated or totaled to determine an aggregate bonus payout value. If the aggregate bonus payout value resulting from the actual outcomes of the bonus free spins is less than the guaranteed or minimum threshold value, the guaranteed value is provided to the player through a supplemental award to the aggregate bonus payout. The supplemental award is equal to the difference between an aggregate bonus value earned from the actual outcomes of the bonus game and the guaranteed or minimum threshold value when the aggregate bonus payout value is less than the guaranteed value. Alternatively, if the aggregate bonus payout value resulting from the outcomes of the free spins exceeds the guaranteed value, the aggregate bonus payout value is provided to the player.

A bonus game with a minimum threshold value for a bonus payout can be desirable by allowing for increased bonus awards to a player in the form, for example, of a supplemental award equal to the difference of the guaranteed or minimum threshold value and the aggregate bonus value. Thus, unlike "kicker" prizes that award a static value when a player fails to receive a certain outcome or meet a certain threshold, the present disclosure provides a supplemental award. With the supplemental award being the delta or difference between the minimum threshold and the aggregate bonus value, the supplemental award changes from one bonus game to another depending on the outcome of the bonus game, and is therefore different from the static value of a "kicker" prize. As a player's aggregate bonus payout value approaches the guaranteed or minimum threshold value, the supplemental award amount that the guarantee provides to the player decreases and goes to zero once the aggregate bonus payout value equals or exceeds the minimum threshold payout value. By using a guaranteed amount or minimum threshold bonus payout, and not kicker or static value, the variable bonus payout feature described herein can be applied much more frequently and at higher thresholds compared to previously known kicker or static bonus payout features.

Figure 5:
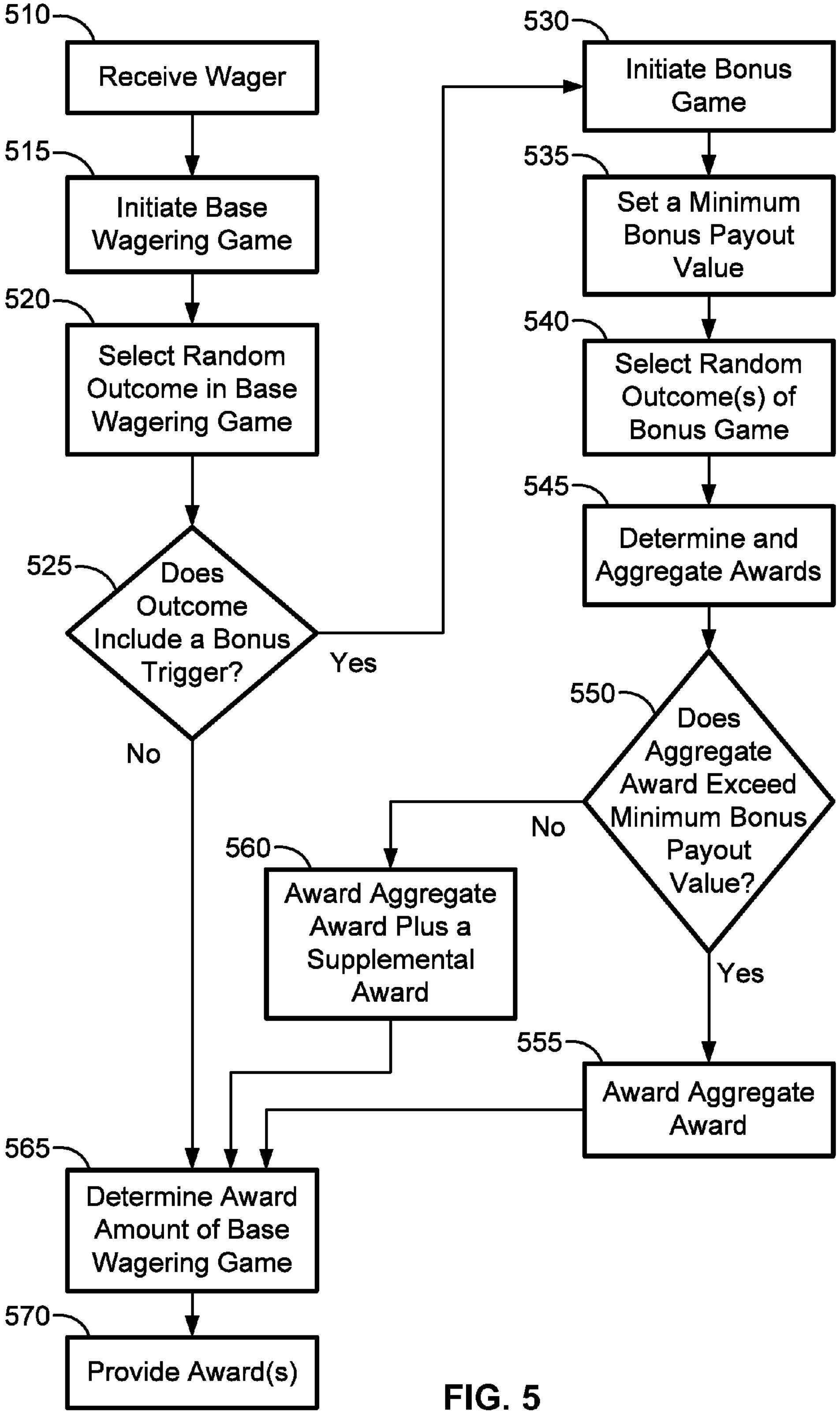
FIG. 5 is a flowchart for an exemplary algorithm that corresponds to instructions executed on a controller for a wagering game with variable bonus payouts, according an embodiment of the present invention.

Turning now to FIG. 5, a flowchart is illustrated, by way of example, for an algorithm that corresponds to instructions for a wagering game with variable bonus payouts executed by the CPU 30, in FIG. 2. The variable bonus payouts correspond to the supplemental award feature described above that are based on the difference or delta between an actual bonus payout value receive as a result of outcome(s) in a bonus game and a minimum threshold or guaranteed bonus payout value that is set for the bonus game. Beginning at step 510, a wager is received from a player of the wagering game to play a base game. As part of the wagering process or prior to the wagering step a player may select certain features for their wagering gaming experience. For example, for a slots-type base game, the player may select paylines and/or whether to place the maximum bet allowed by the wagering game. The base game is then initiated at step 515 via one of more processors, such as CPU 30. At step 520, a random outcome is determined for the base wagering game, which may or may not include a bonus trigger. A bonus trigger may include, in the example of a slots game, the appearance of a certain symbol or combination of symbols, the appearance of a special character or indicia, or a randomly selected, non-visible trigger condition or outcome, among many other possibilities. Other bonus trigger outcomes known in the field of the present disclosure are also contemplated and can include playing a predetermined number of games or placing a maximum bet. At step 525, a decision is made if the outcome includes a bonus trigger. If the decision is negative, the algorithm proceeds to step 565 where an award amount is determined for the base game. If the decision at step 525 is positive, a bonus game is then initiated on one of more processors at step 530.

Following the initiation of the bonus game, a minimum or guaranteed bonus payout value is set at step 535. It is contemplated that the minimum bonus payout value may also be set or determined before the bonus game is initiated. For example, a gaming system may establish predetermined minimum thresholds for bonus payout values that remain constant for a particular wagering game and do not change for that particular wagering game. It is also contemplated that a particular base game or a particular bonus game may have a minimum threshold for bonus payout values that remains constant. The minimum threshold for a bonus payout value may also change depending on the activities of player, including the length of time played or the number of game plays. For example, the minimum threshold may be higher for players who demonstrate their loyalty to a particular game or a particular establishment or that are wagering a greater amount on the triggering spin or over the prior session of games.

After the minimum threshold for a bonus payout value has been set, at least one random outcome for the bonus game is determined or selected at step 540. If the bonus game includes multiple games, such as a series of picks or a series of free spins (e.g., for a slots game), a plurality of random outcomes are determined over the course of the bonus game until the play aspects of the bonus game are completed. At step 545, the one or more processors of a gaming system determines the award(s) for each of the outcome(s) and aggregates or totals those awards. At step 550, if the aggregate award exceeds a minimum threshold of a bonus payout value, the algorithm proceeds to step 555 and awards a player the aggregate award. If the aggregate award does not exceed the minimum threshold for the bonus payout value, then the algorithm proceeds to step 560 where a player is awarded the aggregate award plus a supplemental award. The threshold award that is awarded to a player in step 560 can remain constant. It is also contemplated that in some aspects of the wagering game the guaranteed or minimum threshold award can change. The supplemental award will vary between each play of a bonus game as the difference between the threshold value (e.g., constant or changing) and the aggregate award achieved by the player during play of the bonus game. Next, at step 565, the bonus game is completed and a determination is made of the award amount for the base wagering game. Finally, at step 570, the player is provided with the award amount associated with the base game and the bonus game. The award(s) may be displayed to the player on one or more display device associated with the gaming system. The award(s) may also be displayed in one or more display areas and can include displaying one total award or the separate awards including separately displaying the aggregate award and the supplemental award.

The minimum threshold value for the bonus payout can be determined using different criteria. For example, in some aspects, the minimum threshold may be a predetermined value or it may be randomly determined prior to the implementation of the bonus game. In some aspects, the minimum bonus threshold may only be activated for the bonus game if a player is wagering the maximum bet for a wagering game or, in the context of a slots game, the player has selected all the paylines when the bonus is triggered.

Figure 6:
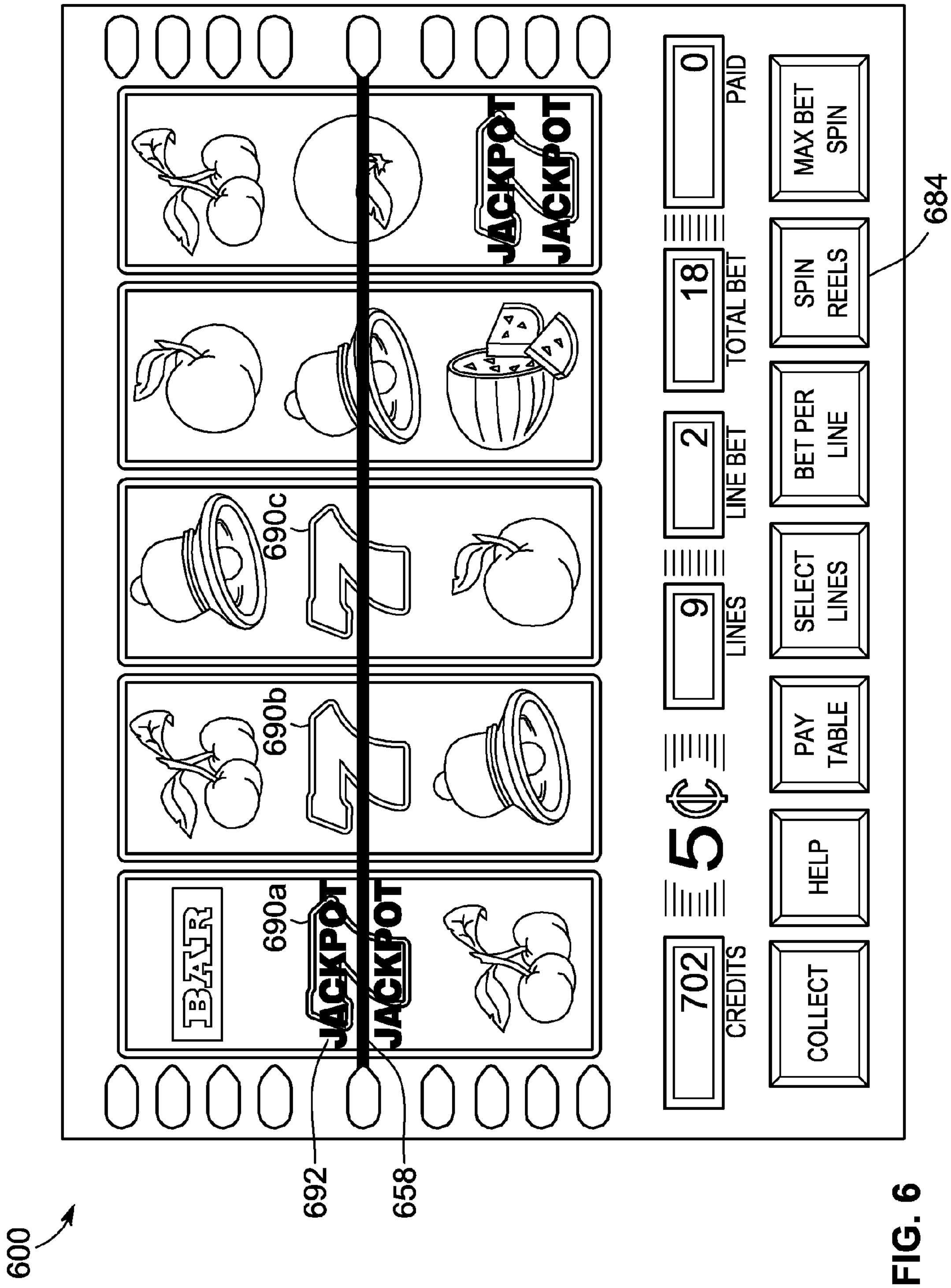
FIG. 6 is an image of an exemplary base-game screen with a bonus trigger outcome displayed on a gaming terminal, according to an embodiment of the present invention.

Referring now to FIG. 6, an exemplary base wagering game screen 600 including an exemplary bonus trigger is illustrated. For illustrative purposes only, the base wagering game is described in the context of a slots game, but the base wagering game can include other wagering games having bonus trigger features. The illustrated slots game can include a plurality of selectable paylines, but in this example only one payline 658 has been selected. The base game begins following the receipt of a wager for the wagering game. The player then initiates the spinning of the reels by pressing pushbutton 684. As the reels come to a stop in the base game, three seven symbols 690*a*, 690*b*, 690*c* appear along the payline 658. Particular symbol combinations can be bonus triggering events, such as the three seven symbols or the appearance of a "Jackpot 7" symbol 690*a* along the active payline 658. Other bonus triggers are also contemplated, and the appearance of a certain symbol along a winning payline is but one of many different bonus triggering events. For example, the words "Jackpot" may be a special marker 692 and the appearance of the special marker 692 anywhere along an active payline may be a bonus trigger regardless of the underlying main symbol used to determine the winning outcome of the base game. Following the spin of the reels, the player will be awarded a certain number of credits for having achieved a winning combination based on the seven-seven-seven symbols 690*a*, 690*b*, 690*c*. The wagering game then proceeds to the bonus game, exemplary aspects of which are provided in FIGS. 7 and 8.

Figure 7:
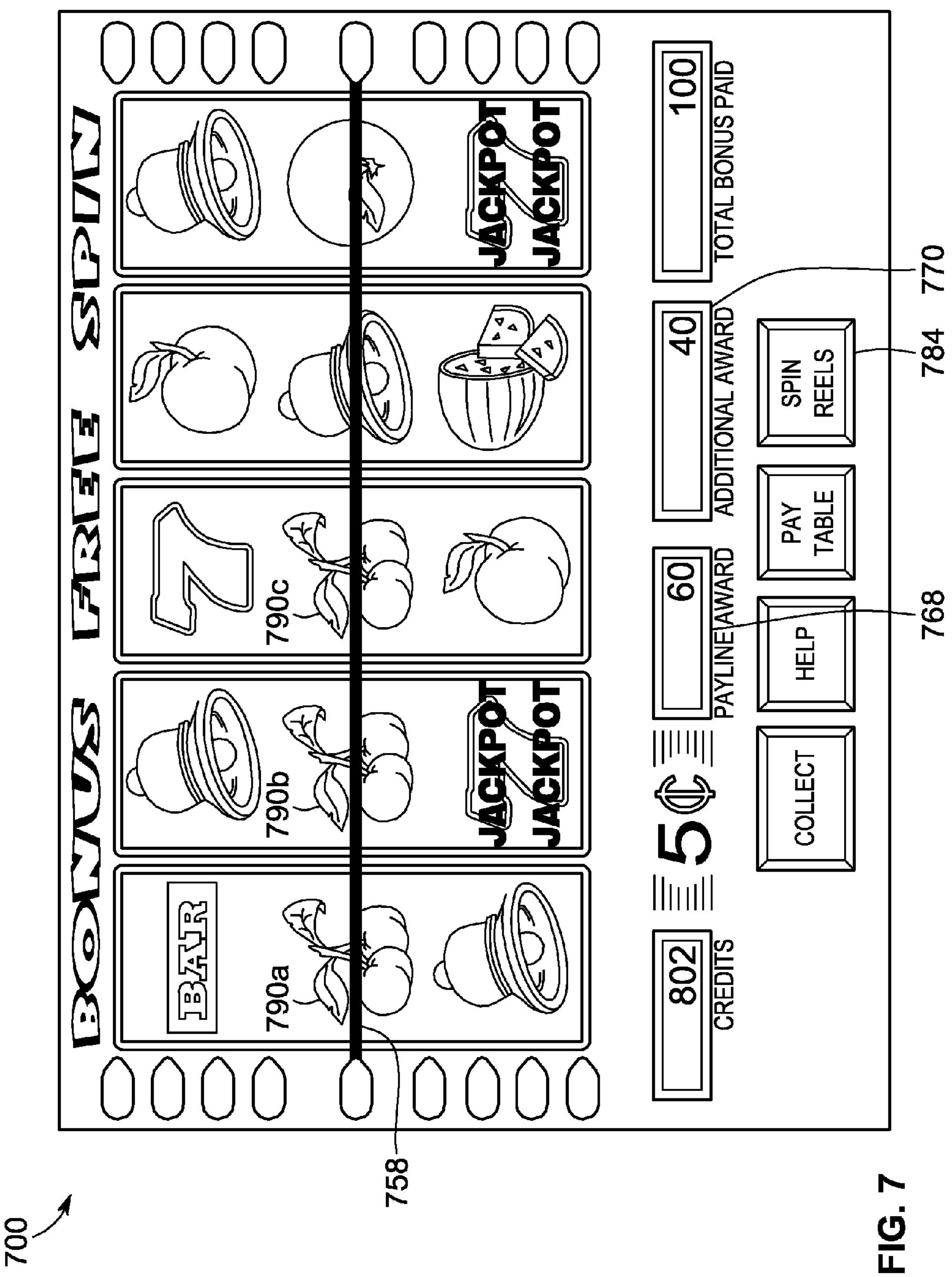
FIG. 7 is an image of an exemplary slots bonus-game screen displayed on a gaming terminal, according to an embodiment of the present invention.

Referring now to FIG. 7, an exemplary slots bonus-game screen 700 is illustrated. Following the bonus triggering event described previously, such as in FIGS. 5 and 6, a player begins play of a bonus game. In the example of FIG. 7, the bonus game includes free spin(s) of a slot game that result in outcomes that are aggregated into a bonus award. The screen 700 shows the result of the player's free spin which has a winning bonus outcome of three cherry symbols, 790*a*, 790*b*, 790*c*, along active payline 758. The bonus payout value associated with the winning bonus outcome is a predetermined number of credits, which in this example for three cherry symbols 790*a*, 790*b*, 790*c*, is sixty credits. The payout value associated with the winning bonus outcome can be displayed in a display area, such as display area 768. The bonus game has a minimum threshold value for the bonus payout, which in this example is one hundred credits. To provide the player the minimum threshold, forty additional or supplemental credits are provided to the player, which may be displayed in an additional award display area 770. Thus, the player receives a total bonus equal to the guaranteed minimum award and the screen 700 further highlights to the player the amount of the received additional award due to the player not achieve the minimum threshold value for the bonus payout. It would be understood that the bonus game can include multiple free spins, such that the outcomes can be aggregated before comparing the aggregate award to the minimum bonus payout value. It is further understood that the bonus game can take the form of a different type of bonus wagering game, such as a picking game which is described for FIG. 8 or other known bonus wagering games.

Figure 8:
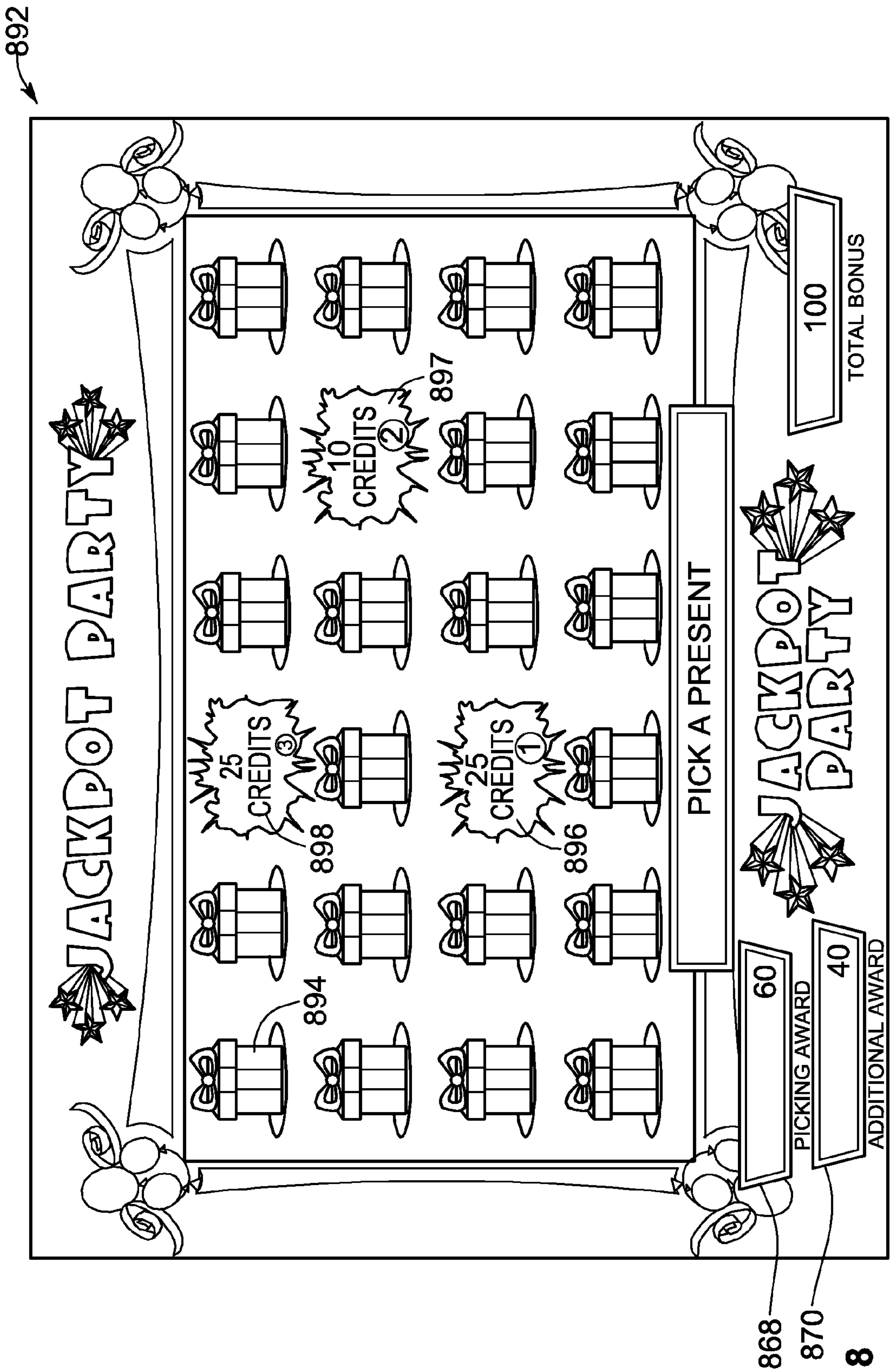
FIG. 8 is an image of an exemplary picking bonus-game screen displayed on a gaming terminal, according to an embodiment of the present invention.

Turning now to FIG. 8, an image of an exemplary picking bonus game to a basic wagering game is illustrated having a minimum threshold bonus payout value. The bonus game screen 892 includes an array of markers 894 located in a plurality of columns and rows, similar to FIG. 4. The bonus game is entered upon the occurrence of a bonus triggering event, such as a start-bonus outcome or other triggering events described previously. In the exemplary bonus game illustrated in FIG. 8, a player selects, one at a time, from the array of markers 894 to reveal an associated bonus-game outcome. According to some aspects of the bonus game, each marker 894 in the array is associated with an award outcome (e.g., credits or other non-negative outcomes) or an end-game outcome. In the illustrated example, a player has been allowed a predetermined number of picks or selections (e.g., three selections) from the entire array and has selected or picked markers at locations 896, 897, and 898. The players respective picks result in the player achieving an aggregate award of sixty credits, where twenty-five credits were awarded by picking location 896, ten credits were awarded for selecting location 897, and another twenty-five credits were awarded for selecting location 898. It is also contemplated, similar to FIG. 4, that a player can keep picking or selecting markers until one or more end-game outcomes are selected, which will terminate the bonus game and the accumulated award outcomes are provided to the player.

The bonus payout associated with the player's picks or selections in the bonus game of FIG. 8 can be displayed in a separate display area, such as display area 868. For the bonus game illustrated in FIG. 8, a minimum threshold value for the bonus payout was set at a predetermined value, which in this example, is one hundred credits. Because the player achieved less than the minimum threshold value during play of the picking bonus game, the layer receives additional credits for the difference between the bonus earned during the picking game and the minimum threshold value, which in this example means the player receives forty additional credits.

The additional award can be displayed in a special display area, such as display area 870 where a supplemental or additional award is displayed to the player. It would be understood that the number of picks in a bonus game can include more or fewer picks and that the individual pick outcomes may be aggregated before comparing the aggregate award to the minimum threshold value for the bonus payout. It would also be understood that the additional award is variable from one instance of a bonus game to the next according to the delta or difference between the aggregate award and the minimum threshold value for the bonus payout of a particular bonus game. In some instances, the additional or supplemental award is zero where the aggregate award is greater than the minimum threshold value. It would further be understood that the bonus game can take the form of different types of bonus wagering games including the slots bonus game described in FIG. 7 along with other types of known bonus games.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming system comprising:

one or more input devices;

one or more display devices;

one or more processors; and one or more memory devices storing instructions that, when executed by the one or more processors, cause the gaming system to:

receive, via at least one of the one or more input devices, an input indicative of a wager for a base wagering game;

initiate the base wagering game;

initiate a bonus game that is associated with the base wagering game;

establish a minimum bonus payout threshold for the bonus game;

determine at least one bonus game outcome for the bonus game;

determine an aggregate award for the at least one bonus game outcome;

in response to the aggregate award being greater than the minimum bonus payout threshold, award the aggregate award; and in response to the aggregate award being less than the minimum bonus payout threshold, award the aggregate award plus a supplemental award, the supplemental award being equal to the difference between the minimum bonus payout threshold and the aggregate award.

2. The gaming system of claim 1, wherein the minimum bonus payout threshold is a predetermined value.

3. The gaming system of claim 2, wherein the predetermined value is constant for all bonus games.

4. The gaming system of claim 1, wherein establishing the minimum bonus payout threshold occurs randomly prior to initiating the bonus game.

5. The gaming system of claim 1, wherein the minimum bonus payout threshold is only activated if the input indicative of a wager is an input indicative of a maximum-bet wager.

6. The gaming system of claim 1, wherein the base game is a slots game and the minimum bonus payout threshold is only activated if a player has selected all paylines before the initiating of the bonus game.

7. The gaming system of game 1, wherein the bonus game outcome is a predetermined number of free spins and the aggregate award is determined based on outcomes of the free spins.

8. A computer-implemented method in a gaming system, the method comprising:

receiving, via at least one of one or more input devices, an input indicative of a wager for a base wagering game;

initiating, via at least one of one or more processors, a base wagering game;

determining, via at least one of the one or more processors, a minimum bonus payout threshold for a bonus game;

initiating, via at least one of the one or more processors, the bonus game in response to a bonus triggering event in the base wagering game;

determining, via at least one of the one or more processors, a bonus game outcome for the bonus game;

determining, via at least one of the one of more processors, an aggregate award for the bonus game outcome;

in response to the aggregate award being greater than the minimum bonus payout threshold, awarding the aggregate award; and in response to the aggregate award being less than the minimum bonus payout threshold, awarding the aggregate award plus a supplemental award, the supplemental award being equal to the difference between the minimum bonus payout threshold and the aggregate award.

9. The computer-implemented method of claim 8, wherein the minimum bonus payout threshold is a predetermined value.

10. The computer-implemented method of claim 9, wherein the predetermined value is constant for all bonus games.

11. The computer-implemented method of claim 8, wherein the determining of the minimum bonus payout threshold is randomly determined prior to initiating the bonus game.

12. The computer-implemented method of claim 8, wherein the minimum bonus payout threshold is only activated if the input indicative of a wager is an input indicative of a maximum-bet wager.

13. The computer-implemented method of claim 8, wherein the base game is a slots game and the minimum bonus payout threshold is only activated if a player has selected all paylines before the initiating of the bonus game.

14. The computer-implemented method of claim 8, wherein the bonus outcome is a predetermined number of free spins and the aggregate award is determined from outcomes of the free spins.

15. The computer-implemented method of claim 8, wherein the awarding of the aggregate award includes displaying the aggregate award on one or more display devices.

16. The computer-implemented method of claim 8, wherein the awarding of the aggregate award and the supplemental award includes displaying a total of the aggregate award and the supplemental award on one or more display devices.

17. One or more physical machine-readable storage media including instructions which, when executed by one or more processors, cause the one or more processors to perform operations comprising:

receiving, via at least one of one or more input devices, an input indicative of a wager;

initiating a base wagering game;

initiating a bonus game in response to a bonus game triggering event in the base wagering game;

setting a minimum bonus payout threshold for the bonus game;

determining a bonus game outcome;

determining an aggregate award for the bonus game outcome;

in response to the aggregate award being greater than the minimum bonus payout threshold, awarding the aggregate award; and in response to the aggregate award being less than the minimum bonus payout threshold, awarding the aggregate award plus a supplemental award via at least one of the one or more processors, the supplemental award being equal to the difference between the minimum bonus payout threshold and the aggregate award.

18. The one or more physical machine-readable storage media of claim 17, wherein the minimum bonus payout threshold is a predetermined value that is constant for all bonus games.

19. The one or more physical machine-readable storage media of claim 17, wherein the setting of the minimum bonus payout threshold is randomly determined prior to initiating the bonus game.

20. The one or more physical machine-readable storage media of claim 17, wherein the minimum bonus payout threshold is only activated if the input indicative of a wager is an input indicative of a maximum-bet wager.

* * * * *